United States Patent [19]
Basu
[11] 3,800,245
[45] Mar. 26, 1974

[54] MODULATION CIRCUIT WHEREIN CLOCK SIGNAL IS MODULATED WITH FIRST AND SECOND MODULATION SIGNALS

[75] Inventor: Samir Basu, Stevenage, England
[73] Assignee: International Computer Limited, London, England

[22] Filed: Oct. 30, 1972
[21] Appl. No.: 301,787

[30] Foreign Application Priority Data
Nov. 2, 1971 Great Britain .................... 50784/71

[52] U.S. Cl. ................ 332/9 T, 307/241, 332/11 R, 332/16 T, 332/21
[51] Int. Cl. ............................................. H03k 7/00
[58] Field of Search......... 332/9 R, 9 T, 11 R, 16 T, 332/23 R, 21; 307/209, 261, 292, 241; 329/50

[56] References Cited
UNITED STATES PATENTS

| | | | |
|---|---|---|---|
| 3,305,728 | 2/1967 | Bailey | 307/292 X |
| 3,585,410 | 6/1971 | Burtness | 307/292 X |
| 3,437,958 | 4/1969 | Shaw et al. | 332/23 R X |
| 3,316,503 | 4/1967 | Lenz | 332/16 R |

*Primary Examiner*—Paul L. Gensler
*Attorney, Agent, or Firm*—Hane, Baxley & Spiecens

[57] ABSTRACT

A signal modulation system in which clock signals can be modulated with first and second modulation signals which are applied to the clock signals through first and second switching circuits. A control means involving threshold devices is so responsive to the operation of the switching circuits that at any one time only one of the switching circuits is able to pass modulation signals to the clock signals.

9 Claims, 2 Drawing Figures

MODULATION CIRCUIT WHEREIN CLOCK SIGNAL IS MODULATED WITH FIRST AND SECOND MODULATION SIGNALS

BACKGROUND OF THE INVENTION

The present invention relates to signal modulation systems.

SUMMARIES OF THE INVENTION

According to a first aspect of the present invention there is provided a signal modulation system including a first circuit for producing an output signal from input signals; a first switch circuit for enabling modulation of the input signal with first modulation signals; a second switch circuit for enabling modulation of said input signal with second modulation signals, and control means so responsive to operation of the switch circuits that at any one time only one of the switch circuits is enabled to pass modulation signals to the first circuit.

According to a further aspect of the present invention, a signal modulation system for modulating a clock signal with data signals includes a source of substantially constant current, first and second circuit paths with said current source being connected to both said circuit paths, current switching means for altering the current through said first and second circuit paths in response to a logical AND function of clock and data signals and output means responsive to said altered currents in said first and second circuit paths for producing data modulated output signals.

In data transmission systems it is often desirable to transmit two streams of data over separate channels. In the present invention, two sets of data signals are applied to a modulating circuit along with a clock signal. The output of the modulating circuit will consist of two channels of complementary signals with alternate clock periods being modulated by the first and second input data signals. The output signals may be applied to a balanced transmission line to communicate with a receiver in a data transmission system.

BRIEF DESCRIPTION OF THE DRAWINGS

A signal modulation system embodying the present invention will now be described, by way of example, with reference to the accompanying drawing, in which.

DESCRIPTION OF THE PREFERRED EMBODIMENT

Figure 1:
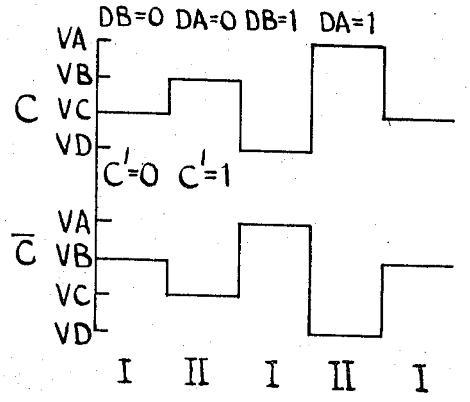
FIG. 1 shows in diagrammatic form the waveform of output signals and, FIG. 2 shows in schematic form a preferred embodiment of the modulation system of the present invention.
Figure 2:
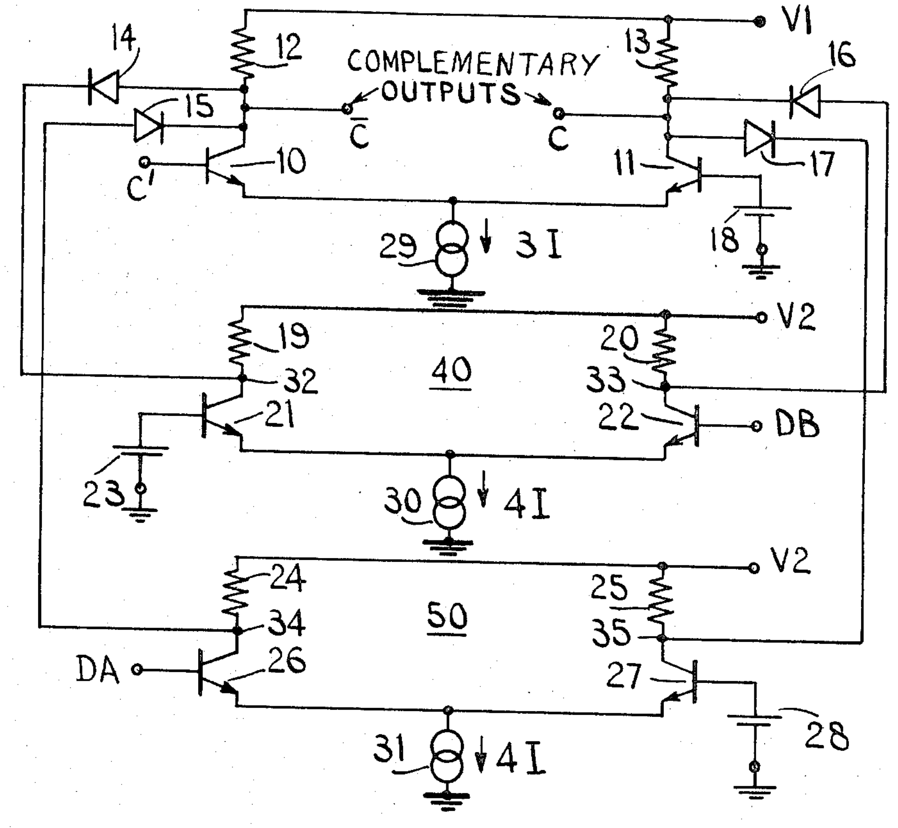

Referring to FIG. 1 there is shown a waveform of the output signals at terminals $\bar{C}$ and C of a circuit arranged to produce complementary outputs from an input (FIG. 2). Alternate clock periods I and II of the input signals are shown with data signasl DB being applied during each period I while data signals DA are applied during each period II. Also during each clock period I, the magnitude of the clock signal C′ is set at zero or low level while during each period II, the clock signal has a high, or unit, value. In FIG. 1, certain values such as VA–VD will represent the output voltage levels of the output terminals of FIG. 2. For example when data DB is equal to binary O, output C will have a level of VC while complementary output $\bar{C}$ will have a level of VB. Similarly in period II when data DA has a value of binary O, output C will be at a level of VB while complementary output $\bar{C}$ will be at a level of VC.

A preferred embodiment of the modulating circuit of the present invention is shown in FIG. 2. A binary clock signal C′ is applied to the base of transistor 10 which is connected to transistor 11 as a long-tailed pair. A steady d.c. voltage source V1 is connected through resistors 12 and 13 to the collector electrodes of transistors 10 and 11, respectively. Complementary output signals $\bar{C}$ and C are taken from the collectors of transistors 10 and 11 while the emitters are connected to a source of constant current 29. The base of transistor 11 is held at a reference potential by source 18.

A switching circuit portion 40 of the modulating circuit includes resistors 19 and 20 connected to the collector electrodes of transistors 21 and 22. The collector electrode of transistor 21 is connected at point 32 through threshold diode 14 to the output $\bar{C}$, while collector of transistor 22 is connected at point 33 through threshold diode 16 to output C. The emitter electrodes of transistors 21 and 22 are connected as a long-tailed pair to a source 30 of substantially constant current. The base of transistor 21 is held at a reference potential by a reference source 23, while data signals DB are applied to the base of transistor 22.

A similar switching circuit portion 50 includes a voltage source V2 which is connected to resistors 24 and 25, each of which is connected through points 34 and 35 to transistors 26 and 27, respectively. Point 34 is connected to output $\bar{C}$ through threshold diode 15 while point 35 is connected to output C through threshold diode 17. The emitter electrodes of transistors 26 and 27 are connected as a long-tailed pair to a source 31 of substantially constant current. Data signals DA are applied to the base of transistor 26 while the base of transistor 27 is held at a reference potential by a reference source 28.

Before discussing the detailed operation of the circuit, the relationships of various circuit parameters will be noted. These parameters may be stated as follows: (1) Data and clock input signals are binary in form and the respective transistors to which the signals are applied are non-conductive upon application of a binary 0 and conductive upon application of a binary 1; (2) Diodes 14–17 are only conductive when a particular threshold voltage from anode to cathode, say + 2V., is present; (3) The difference between potentials V1 and V2 is less than the diode threshold voltage. For example, V1 may be 8V while V2 is say, 7V; (4) The value of each of resistors 12 and 13 is twice the resistance of any of resistors 19, 20, 24 or 25. Thus if resistors 12 and 13 are, for example 2K ohms, each of resistors 19, 20, 24 and 25 is equal to 1K; (5) The constant current drawn by source 29 is set at 3 units, or say 3 m.a., while the constant current drawn by sources 30 and 31 are 4 units or, for example, 4 m.a. unit of current will be defined by equation (1) while the four voltage levels VA–VD which may occur at output $\bar{C}$ and C will be defined by equations (2) - (5)

$$I = 2(V1 - V2)/R \quad (1)$$

Where $R = R12, R13,$ $$VA = V1$$

(2)

$$VB = V1 - IR$$

(3)

$$VC = V1 - 2IR$$

(4)

$$VD = V1 - 3IR$$

(5)

The operation of the modulating circuit of FIG. 2 will now be described. It is believed that by using numerical examples where possible, it will be helpful in providing an understanding of the circuit operation. Since the data signals may be either binary 0 or binary 1 in either of two alternate clock periods, any one of four voltage output levels VA–VD at a particular output terminal during two successive clock periods may occur.

In the first condition it will be assumed that the clock signal C′ is a binary zero and that signal DB is also binary 0. In this condition, both transistors 10 and 22 are non-conductive while transistors 11 and 21 draw currents of 3I and 4I, respectively. As a result of a current flowing through resistor 19, the potential at point 32 will be reduced so that diode 14 is forward biased with a current (I) being drawn from potential V1 through resistor 12 and diode 14 to point 32 while a current of three units (3I) is drawn from potential V2 through resistor 19 to point 32. Thus, by drawing a single unit (I) of current through resistor 12, the voltage at output $\overline{C}$ will be VB. Using a numerical example, it will be seen that a unit of current (I) through resistor 12 produces a voltage drop of 2v thereacross with the potential at $\overline{C}$ being 6v as V1 is set to 8v. As transistor 26 is non-conductive during clock periods I of binary O, point 34 will assume the potential V2, or 7v and the threshold of diode 15 (2v) will not be reached and diode 15 remains off.

As transistor 11 draws a current of 3I, a unit current I will be drawn from potential V2 through resistor 20 and diode 16 to transistor 11. A current of 2I will then be drawn through resistor 13 from potential V1 causing output C to reach a voltage level of VC. In numerical terms, with a unit of current flowing through resistor 20, point 33 will be at 6v while output C is at 4v due to a drop of 4v across resistor 13. Thus the threshold of diode 16 is reached as a potential difference of 2v is applied in a forward direction. Also with a current of 4I being drawn through transistor 27, the potential difference between point 35 and output C will be insufficient to overcome the threshold of diode 17 which will remain in a blocking condition.

The second condition of circuit operation occurs when data signal $DB = 1$. It will be remembered however that the clock signal C′ will equal zero regardless of the value of data signal DB. In this condition, transistor 22 is rendered fully conductive while transistor 21 is rendered non-conductive. With transistor 22 drawing a current of 4I the potential at point 33 is reduced and this has the effect of blocking diode 16. Thus, a current of 3I is drawn through transistor 11 and resistor 13 causing output C to reach a voltage level of VD.

In numerical terms by drawing a current of 4I through resistor 20, point 33 assumes a potential of 3v (as V2 = 7v). However, as a current of 3I is drawn through resistor 13, output C reaches a potential of 2v. Thus diode 16 remains in a blocking condition as the threshold of 2v thereacross in not reached.

With transistor 21 in a non-conducting condition, point 32 reaches the potential V2 which in turn causes diode 14 to be reversed biased. Similarly, the potential difference between point 34 and output $\overline{C}$ is insufficient to cause diode 15 to conduct so that output $\overline{C}$ attains a voltage level of VA.

In numerical terms with point 32 at 7v (V2) and output $\overline{C}$ at 8v (V1), diode 14 remains reversed biased. Also, with point 34 at 7v, the potential difference across diode 15 (1v) is below the threshold of diode 15 which remains in a blocking condition.

During clock periods when $C' = 1$, or during periods when DA is applied to the modulating circuit, operation of the circuit will be similar to the operation described above. In the case when $C' = 1$, transistor 10 will be held in a conductive condition while transistor 11 will be rendered non-conductive. In view of the previous description of circuit operating during clock periods when $C' = 0$, it is believed that a further discussion of the operation when the clock signal $C' = 1$ is not necessary.

A further feature of the modulating circuit shown in FIG. 2 is that a locking effect is achieved which prevents data signals from being applied during an improper clock period. For example, as stated earlier, data signals DB are applied to the circuit during clock period I (FIG. 1) when $C' = 0$. If however, a data signal DA were erroneously applied to the base of transistor 26 during such a clock period, the potential at point 32 would be reduced from V2 while the potential at point 35 would be raised to V2 with transistor 27 being rendered non-conductive. However, these voltage changes only operate to increase the reverse bias of diodes 15 and 17. By lowering the potential at point 34 the anode voltage of diode 15 is reduced and while this diode was non-conducting due to an insufficient threshold voltage under correct conditions, the diode 15 is reversed bias and remains non-conducting when a data signal DA is erroneously applied. Similarly, the potential of point 35 is raised which increases the cathode potential of diode 17 causing the same to remain non-conductive as a result of being reversed biased. Therefore, the erroneous application of data signals will not cause conduction of any non-conducting diodes and will have no effect on the outputs C and C.

In the modulating circuit of the present invention, the output voltage levels VA-VD which appears in complementary form at outputs $\overline{C}$ and C are determined by current switching operations. It will be seen that voltage levels VA–VD are controlled by the current flowing through, into, or out of circuit paths such as the circuit path comprised of transistor 10 and resistor 12. The switching of such currents is controlled by both the clock signals and data signals produce any one of four voltage levels VA–VD at outputs $\overline{C}$ and C. Also it will be noticed that when current is caused to flow into one circuit path say into transistor 11 through diode 16, an equal current is caused to flow out of the other circuit path through diode 14 as complementary output voltages produced at outputs $\overline{C}$ and C. Thus, output levels at outputs are determined as logical AND functions of the clock and data signals.

While n-p-n transistors 10, 11 etc. have been disclosed, it will be realised that other suitable semiconductor switching devices, such as FET's, may be employed. Also, although breakdown diodes 14, 15, etc. are described, it is clear that other breakdown device having definable voltage thresholds may be employed.

I claim:

1. A signal modulation system, comprising:
a modulation circuit for modulation of an input signal to produce an output signal;
a first switch circuit for enabling said modulation of said input signal to be effected by a first modulation signal;
a second switch circuit for enabling said modulation of said input signal to be effected by a second modulation signal;
first threshold means interconnecting said modulation circuit and said first switch circuit, for passing said first modulation signal to said modulation circuit in response to a first logical AND function of said input signal and said first modulation signal; and
second threshold means interconnecting said modulation circuit and said second switch circuit, for passing said second modulation signal to said modulation circuit in response to a second logical AND function of said input signal and said second modulation signal, said first and second threshold means being such that at any given time only one of said first and second modulation signals is passed to said modulation circuit, the other of the modulation signals being prevented from being so passed.

2. A signal modulation system as claimed in claim 1, in which the modulation circuit comprises a complementary output circuit producing first and second complementary output signals.

3. A signal modulation system as claimed in claim 2, wherein the complementary output circuit includes first and second semiconductor devices connected as a long tailed pair, in which the first device has a first electrode connected to receive input signals, the second device has a first electrode connected to receive a reference voltage, and in which each semiconductor device has a second electrode connected to receive a control voltage, and said modulation signals and to provide the modulated output signals.

4. A signal modulation system as claimed in claim 2 in which the switch circuits are each complementary output circuits.

5. A signal modulation system as claimed in claim 4, wherein each switch circuit includes first and second semiconductor devices connected as a long-tailed pair in which the first device has a first electrode connected to receive modulation signals, the second device has a first electrode connected to receive a reference voltage, and in which each device has a second electrode connected to receive a control voltage and to provide said modulation signals at the control means.

6. A signal modulation system comprising:
a modulation circuit for modulation of an input signal to produce an output signal, said modulation circuit having two distinct states determined by the value of said input signal;
a first input circuit responsive to a first modulation signal;
a second input circuit responsive to a second modulation signal;
a first threshold means interconnecting said first input circuit to said modulation circuit for application of said first modulation signal to said modulation circuit, and responsive to the state of said modulation circuit to permit said first modulation signal to effect said modulation of the input signal only when the modulation circuit is in its said first state; and
a second threshold means interconnecting said second input circuit to said modulation for application of said second modulation signal to said modulation circuit, and responsive to the state of said modulation circuit to permit said second modulation signal to effect said modulation of the input signal only when the modulation circuit is in its said second state.

7. A signal modulation system according to claim 6 wherein said modulation circuit comprises at least one current path, means for controlling the current flowing through said path in accordance with the value of said input signal, and means for deriving said output signal from said current, and wherein each said threshold means comprises at least one diode connected to said path, said diode being biased into a non-conducting condition when the current in said path lies within a predetermined range of values, and being permitted to become conducting when the current in said path lies outside said predetermined range of values, thereby permitting said diode to draw a current from or inject a current into said path in accordance with the value of the corresponding modulation signal, and thereby to correspondingly modify the value of said output signal.

8. A signal modulation system according to claim 6 wherein said modulation circuit comprises a source of substantially constant current, first and second current paths connected in parallel to said source, said paths respectively comprising first and second switching devices which are responsive to said input signal to cause the current from said source to flow wholly through the first path when the value of the input signal corresponds to said first state of the modulation circuit, and wholly through the second path when the value of the input signal corresponds to said second state, and means for deriving a pair of complementary output signals respectively from the currents flowing in said paths, and wherein each of said threshold means comprises two diodes connected respectively to said first and second paths, said diodes being biased to be non-conducting when the modulation circuit is in one of its two states, and being permitted to become conducting when the modulation circuit is in its other state thereby permitting said diodes respectively to draw a current from one said path and to inject an equal current into the other said path in accordance with the value of the corresponding modulation signal, and thereby to correspondingly modify the values of said two output signals.

9. A signal modulation system comprising:
a output circuit for producing an output signal having first and second values according to the value of a binary input signal;
first threshold means for applying a first binary modulation signal to said output circuit when said input signal represents a binary 1, to modify the value of the output signal from said first value to a third value when the first modulation signal represents a binary 0 and to leave the value of the output signal unchanged at said first value when the first modulation signal represents a binary 1; and second threshold means for applying a second binary modulation signal to said output circuit when said input signal represents a binary 0, to modify the value of the output signal from said second value to a fourth value when the second modulation signal represents a binary 0 and to leave the value of the output signal unchanged at said second value when the second modulation signal represents a binary 1.

* * * * *